United States Patent
Hines

(10) Patent No.: US 7,460,777 B1
(45) Date of Patent: Dec. 2, 2008

(54) COVERT WIDE-ANGLE CAMERA ADAPTER

(76) Inventor: Stephen P. Hines, 1540 Wabasso Way, Glendale, CA (US) 91208

( * ) Notice: Subject to any disclaimer, the term of this patent is extended or adjusted under 35 U.S.C. 154(b) by 0 days.

(21) Appl. No.: 11/825,559

(22) Filed: Jul. 5, 2007

(51) Int. Cl.
  G03B 7/00 (2006.01)
  G03B 29/00 (2006.01)
  G03B 11/00 (2006.01)
  H04N 7/00 (2006.01)
  G02B 13/06 (2006.01)

(52) U.S. Cl. .................... 396/71; 396/433; 396/544; 348/36; 359/725

(58) Field of Classification Search .................... 396/71, 396/429–434, 544; 359/366, 699, 725; 348/36
See application file for complete search history.

(56) References Cited

U.S. PATENT DOCUMENTS

| | | | | |
|---|---|---|---|---|
| 3,209,073 A * | 9/1965 | Falbel | ............ | 348/36 |
| 3,376,446 A | 4/1968 | Haan et al. | ............ | 313/385 |
| 3,885,242 A | 5/1975 | Duran | ............ | 354/296 |
| 5,115,342 A | 5/1992 | Rowe et al. | ............ | 354/295 |
| 5,214,538 A | 5/1993 | Lobb | ............ | 359/691 |
| 5,424,877 A | 6/1995 | Tsuyuki et al. | ............ | 359/663 |
| 5,550,610 A | 8/1996 | DeMarco | ............ | 354/295 |
| 5,550,611 A | 8/1996 | Ishida et al. | ............ | 354/400 |
| 5,734,496 A * | 3/1998 | Beach | ............ | 359/366 |
| 5,995,280 A * | 11/1999 | Beach | ............ | 359/366 |
| 6,424,469 B2 * | 7/2002 | Hirai | ............ | 359/699 |
| 6,449,103 B1 * | 9/2002 | Charles | ............ | 359/725 |
| 6,481,860 B1 | 11/2002 | Chang | ............ | 359/867 |
| 7,104,657 B2 | 9/2006 | Sherwin | ............ | 359/511 |
| 7,160,248 B2 | 1/2007 | Alekseenko et al. | ............ | 600/130 |
| 2007/0003277 A1 | 1/2007 | Stapleton | ............ | 396/544 |
| 2007/0024971 A1 | 2/2007 | Cassarly et al. | ............ | 359/487 |

\* cited by examiner

*Primary Examiner*—Melissa J Koval
(74) *Attorney, Agent, or Firm*—Wagner, Anderson & Bright, LLP; Roy L Anderson

(57) ABSTRACT

A reflective tube centered on a lens of a camera is used in covert wide-angle photography in which and at least one reflected annular image is rotated by 180° to register it with the open-hole (zero-order) image to obtain a wide-angle corrected image. Any exposure differences in reflected images are balanced (or matched to the zero-order image) and rotation of odd-order image(s) is done by dedicated electronics of the camera or a later computer program to align such images with the zero-order image while the photograph is taken of an object using a tube which is no longer than approximately $\frac{1}{100}^{th}$ the distance of the photographic subject. The reflective tube can be a transparent material (such as Plexiglas®) whose outer surface is painted black to block stray light which would otherwise be transmitted by walls of the tube and to absorb second-surface reflections from inside.

35 Claims, 6 Drawing Sheets

COVERT WIDE-ANGLE CAMERA ADAPTER

FIELD OF THE INVENTION

The present invention is in the field of covert photography.

BACKGROUND OF THE INVENTION

Covert photography has been an important part of intelligence gathering for decades. It can mean taking pictures in the open when others cannot tell pictures are being taken (such as from a concealed camera) or taking pictures from afar using sophisticated photographic equipment (or even spy satellites).

The present invention is directed to two different, but related, types of covert photography.

First, the present invention addresses the situation where a structure conceals what is being done but there is an opening through which viewing and/or photography can take place.

Second, the present invention addresses the situation where a wide-angle photograph is desired, but it is not desirable to have expensive (and obvious) wide-angle lenses. Such a situation might arise when an operative is in a foreign venue or a venue where having such equipment, especially if the operative is near a sensitive military base or other location, might arouse suspicion or attract unwanted attention, especially if one has to go through a checkpoint or customs. In this situation, part of being covert is the ability to create needed equipment from common materials that will not arouse suspicion.

SUMMARY OF THE INVENTION

The present invention is generally directed to covert wide-angle photography in which a reflective tube is centered on a lens of a camera and at least one annular image is reflected by the interior wall of the tube, later corrected with a 180° rotation to register it with the open-hole (zero-order) image to obtain a wide-angle corrected image.

In a first, separate group of aspects of the present invention, any exposure differences in reflected images are balanced (or matched to the zero-order image) and rotation of odd-order image(s) is done by dedicated electronics of the camera or a later computer program to align such images with the zero-order image, while the photograph is taken of an object using a tube, which is no longer than approximately $\frac{1}{100}^{th}$ the distance of a photographic subject from the tube, and a lens aperture of the camera is adjustable to provide a large depth of field and sharp image in a stopped-down mode.

In other, separate aspects of the present invention, the reflective tube is a transparent material (such as Plexiglas®) whose outer surface is painted black to block stray light which would otherwise be transmitted through the walls of the tube and to absorb second-surface reflections from inside Accordingly, it is a primary object of the present invention to provide improved covert wide-angle photography through use of a reflective tube.

This and further objects and advantages will be apparent to those skilled in the art in connection with the drawings and the detailed description of the preferred embodiment set forth below.

DETAILED DESCRIPTION OF THE INVENTION

The present invention provides a technique for using a reflective tube as a wide-angle camera adapter. The inner wall of the tube reflects parts of the scene beyond the field of view of the open hole, useful for covert photography, essentially having the effect of placing the eyeball at the front of the tube.

The present invention can be used with a conventional camera, although it is especially preferred that the camera be equipped with electronics useful for performing functions described hereinafter. If the camera is a digital camera, the camera can be used for viewing a wide-angle display on the camera's display and any image can conveniently be stored in an appropriate storage medium or transmitted to a remote location. Also, the camera may be designed for use in the present invention, but concealed in terms of its function by appearing as an ordinary camera.

Figure 1:
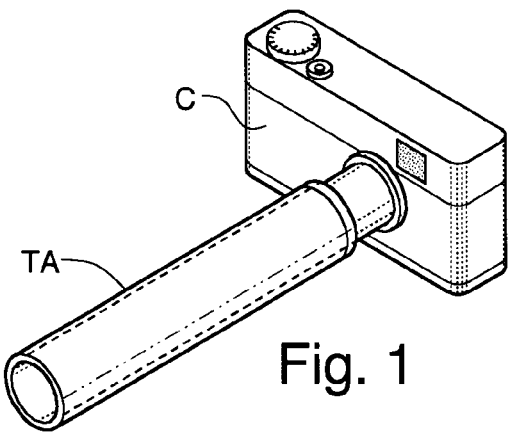
FIG. 1 is a general view of a camera that has been adapted with a hollow-tube wide angle adapter according to the present invention.

A camera C fitted with a reflective tube TA centered on the camera's lens is depicted in FIG. 1. The reflective tube can be fitted in any number of manners, and an adapter useful for fitting reflective tubes of various diameters (such as being threaded onto the camera lens, or pressed against a custom modified funnel type device for automatic centering) can easily be designed depending upon the characteristics of the camera to be used.

Figure 2:
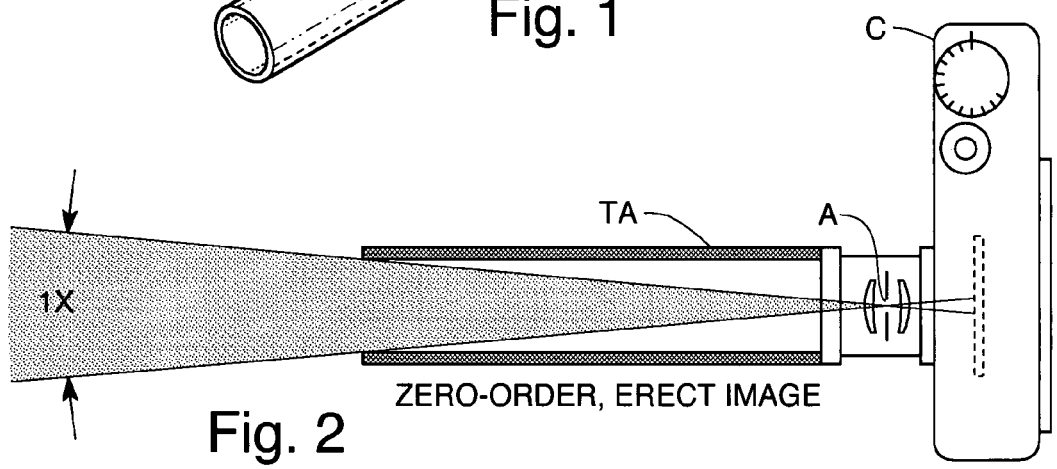
FIG. 2 is a schematic showing the ray trace for the zero-order image in the camera of FIG. 1.
Figure 2A:
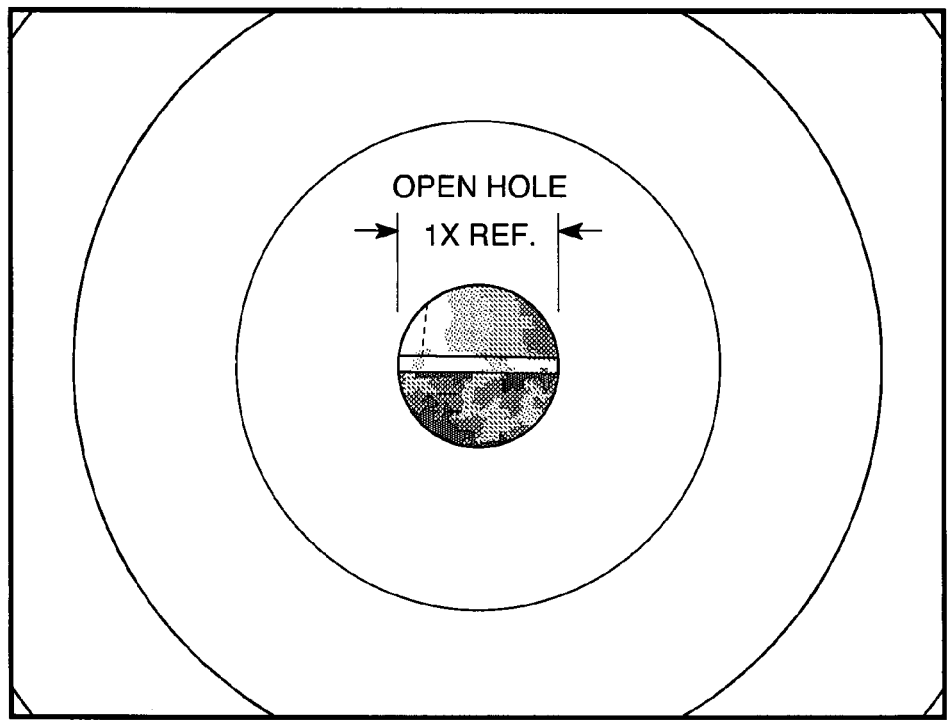
FIG. 2a illustrates the zero-order image seen through the hollow-tube wide angle adapter of FIG. 1.

FIG. 2 shows the field of view of camera C in FIG. 1 viewed through the open-hole of the reflective tube and FIG. 2a depicts this image. This image will hereinafter be referred to as a zero-order image because it has not been reflected off of any wall of the reflective tube before it reaches aperture A of camera C.

Figure 3:
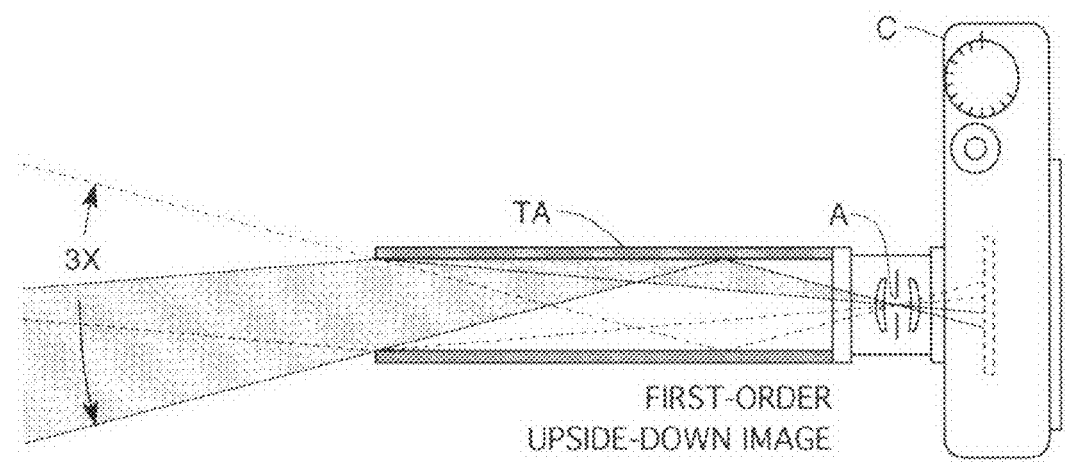
FIG. 3 is a schematic showing the ray trace for the first-order image in the camera of FIG. 1.
Figure 3A:
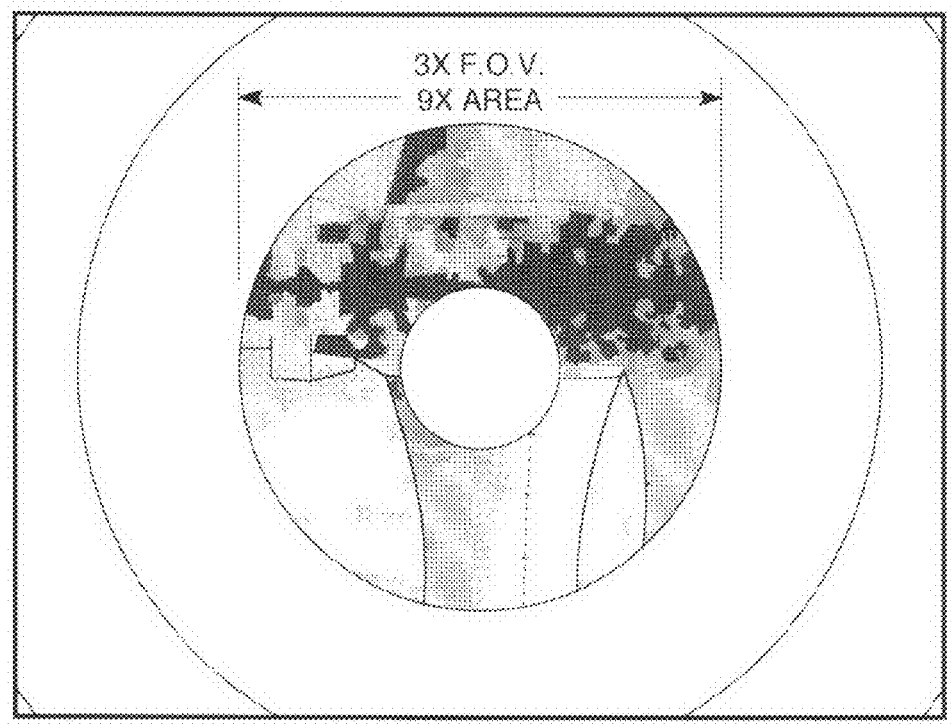
FIG. 3a illustrates the first-order image seen reflected once off the wall of the hollow-tube wide-angle adapter of FIG. 1 (with the zero-order image not shown).
Figure 4:
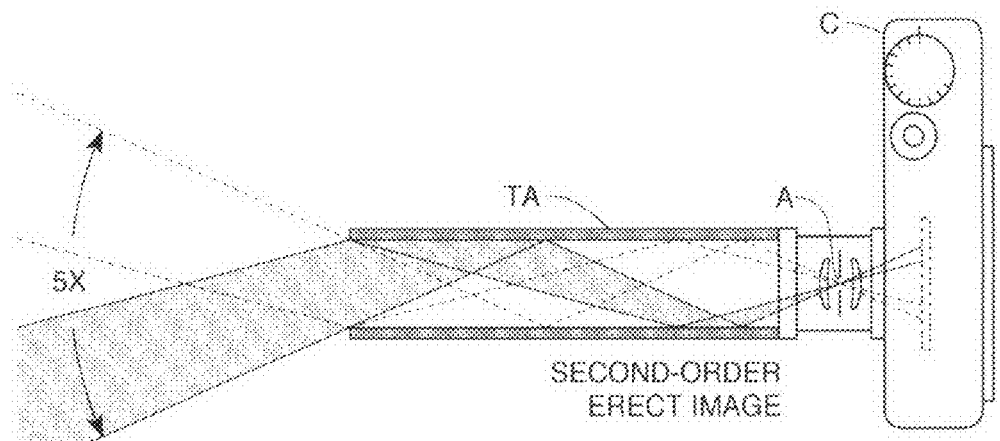
FIG. 4 is a schematic showing the ray trace for the second-order image in the camera of FIG. 1.
Figure 4A:
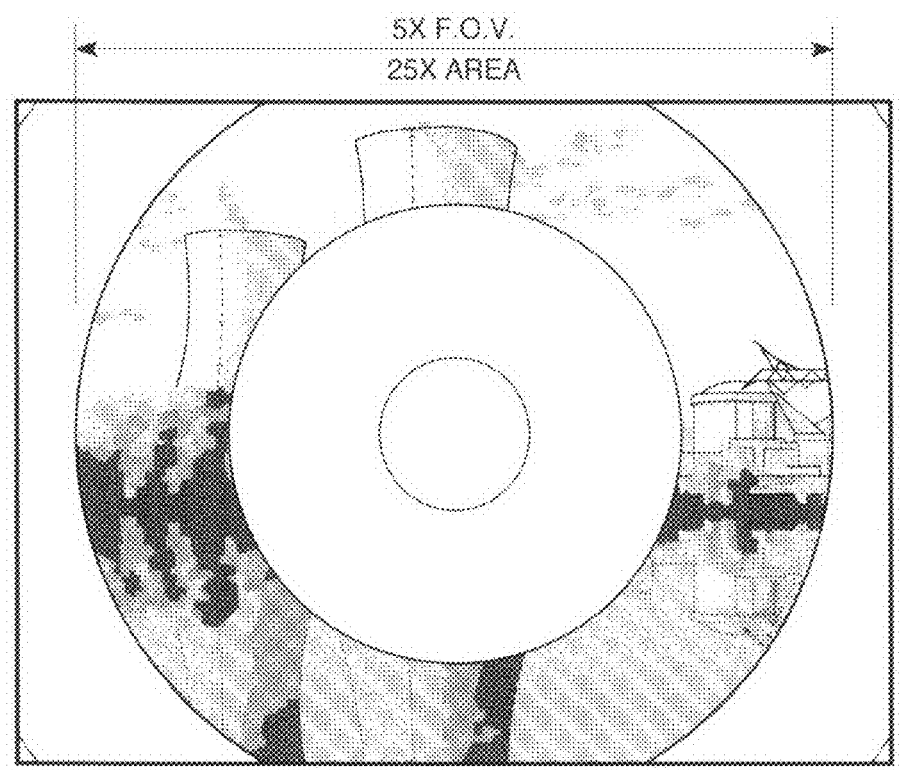
FIG. 4a illustrates the second-order image seen reflected twice off the wall of the hollow-tube wide-angle adapter of FIG. 1 (with the other order images not shown).
Figure 5:
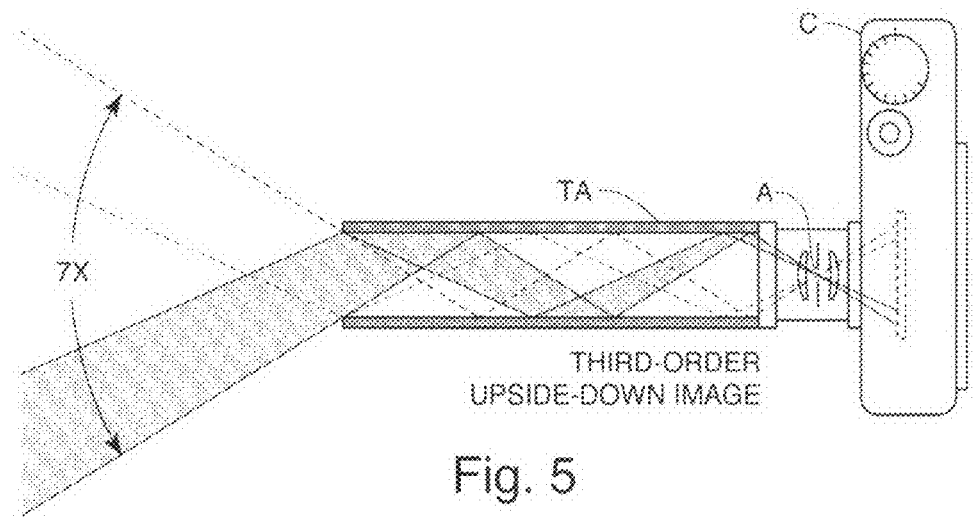
FIG. 5 is a schematic showing the ray trace for the third-order image in the camera of FIG. 1.
Figure 5A:
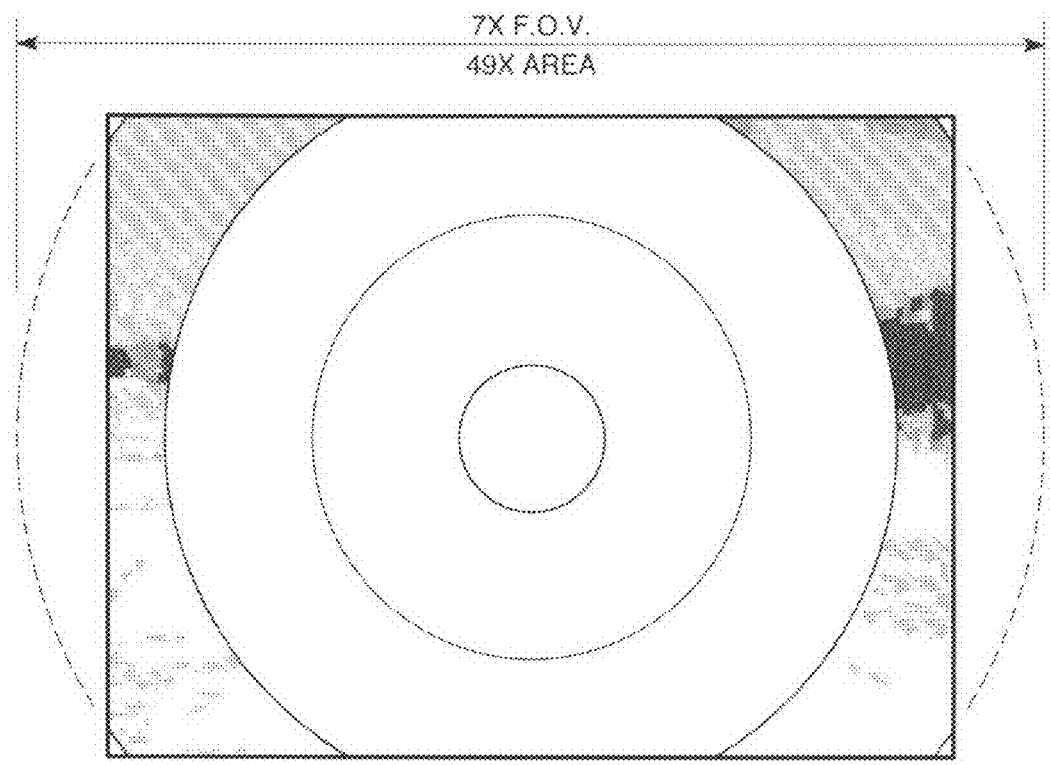
FIG. 5a illustrates the third-order image seen reflected three times off the wall of the hollow-tube wide-angle adapter of FIG. 1 (with the other order images not shown).
Figure 6:
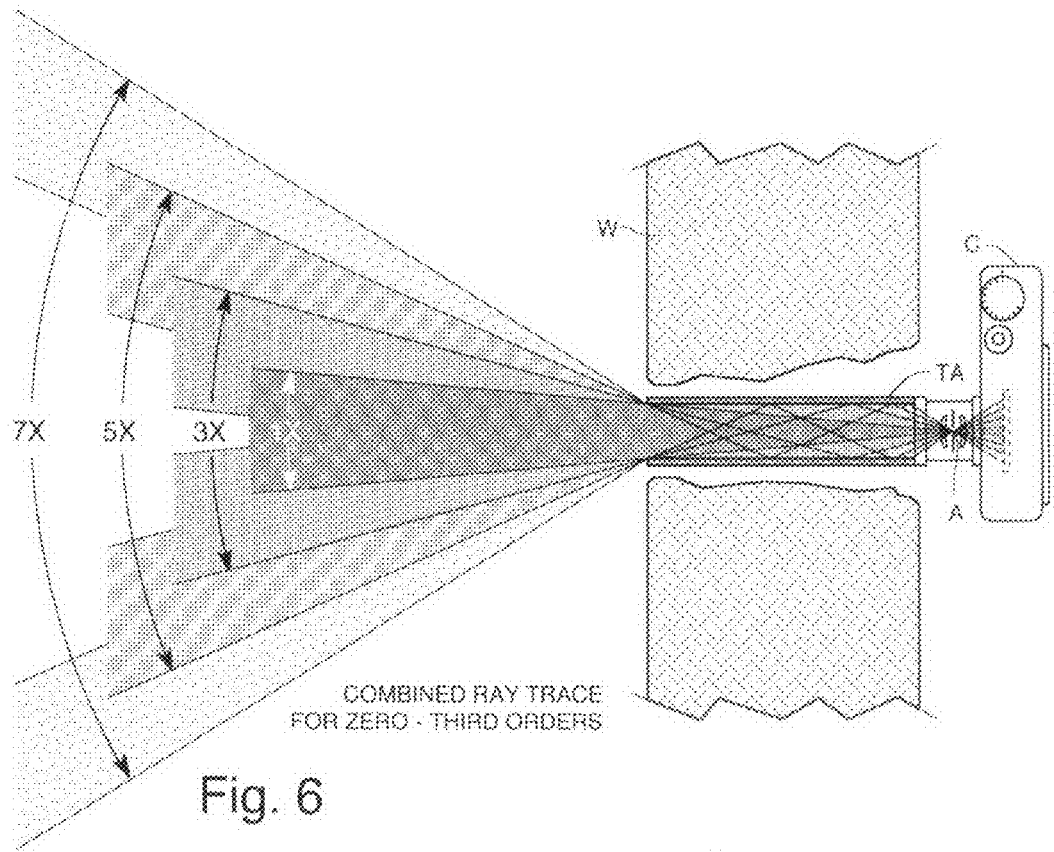
FIG. 6 illustrates the combined ray traces for zero through third order images in the camera of FIG. 1.
Figure 6A:
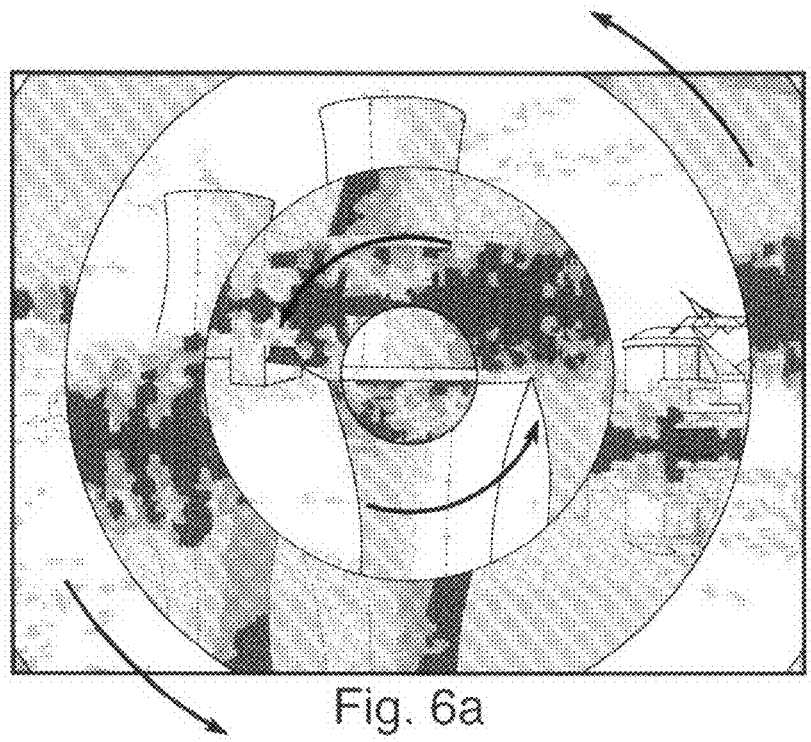
FIG. 6a illustrates the zero through third order images of FIGS. 2a, 3a, 4a and 5a, combined.
Figure 7:
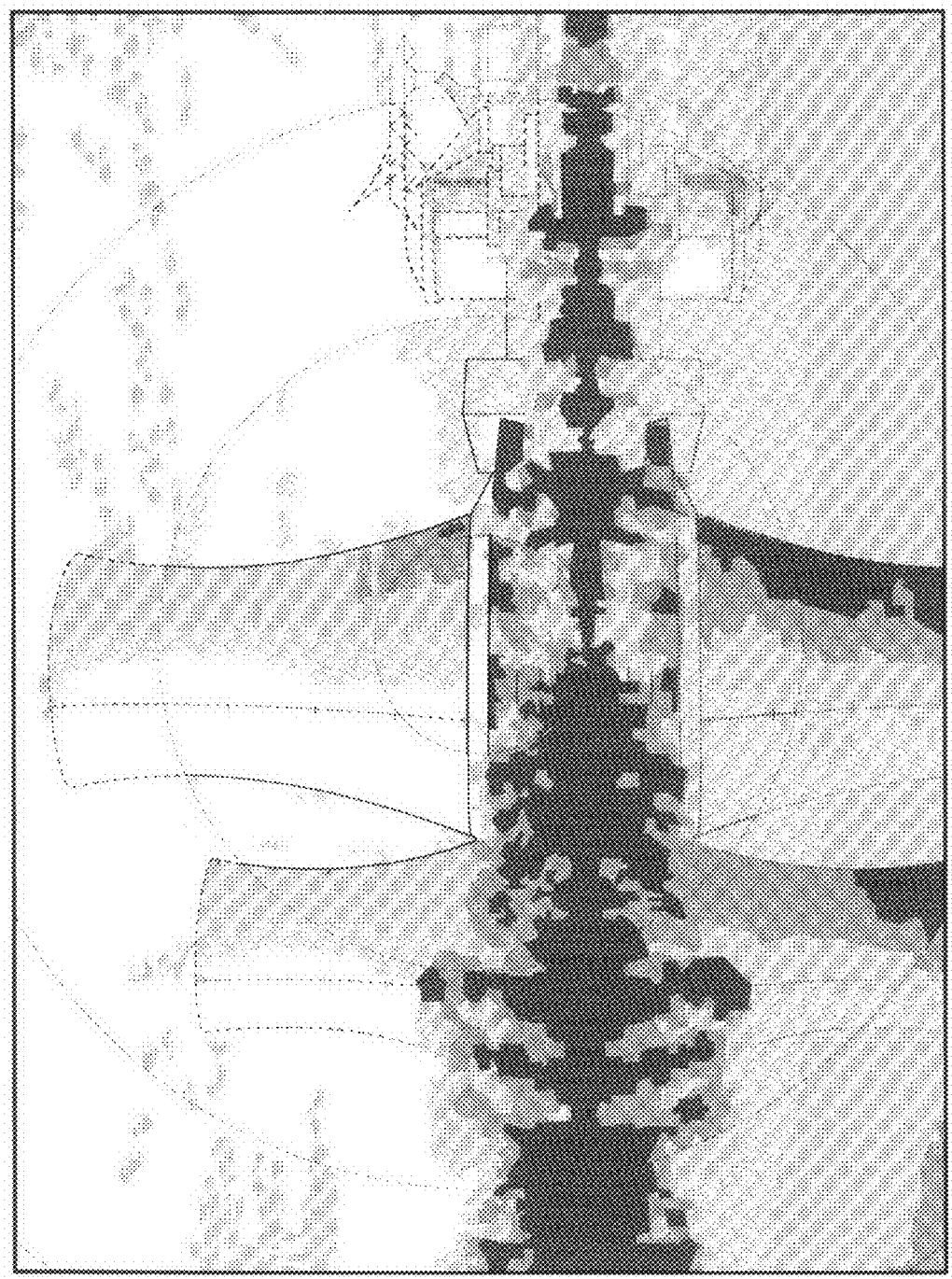
FIG. 7 illustrates the images of FIG. 6a after the first and third order images have been rotated 180° and after images greater than the zero order image have been adjusted to compensate for any decreased light intensity.

FIG. 3 shows the field of view of camera C in FIG. 1 viewed after one reflection off of the inner wall of the reflective tube while FIG. 3a depicts this image. Because this image is obtained by only one reflection, the image is vertically flipped and horizontally flopped so as to give the appearance of being rotated 180° as is shown in FIG. 3a. Such an inversion will happen any time the image is obtained as a result of an odd number of reflections, whereas any image obtained from an even number of reflections will not give the appearance of being rotated (see, for example, the second order reflection shown in FIG. 4a). FIGS. 5 and 5a are similar to FIGS. 3 and 3a, respectively, except they show additional orders of reflection. In FIGS. 3, 4 and 5 the ray traces are shown with one side drawn in solid lines, the other dashed, to separate the rays. FIG. 6 is a combination of the combined ray traces for zero through third order when the front of tube TA is positioned flush with an opening in wall W while FIG. 6a depicts these images.

To combine a first (or higher odd-numbered) order image (s) with a zero-order image electronics or a later computer program are used to rotate any odd-numbered order image and register it with the zero order image.

The inner surface quality of the reflective tube used with the camera will affect the quality of images obtained by the tube. Preferably, the tube should be made of high optical quality since this will produce the best images. Such a tube might be made of beryllium, molybdenum or stainless steel that has been diamond turned to get a specular finish. With such a tube, there should be little degradation in image quality or reduced brightness due to multiple reflections. Such a tube might be concealed as a ball point pen barrel or even as tubular metal cigar cases (which have a larger diameter and could be combined together for additional length), or something else, and attached to the camera lens when needed. However, for situations where such a tube is not practical, or where improvisation is needed in the field, another solution is needed.

An especially preferred embodiment of a reflective tube designed for improvised use or when it must be obtained in the field is a plastic tube obtained from a commercial source, such as a Plexiglas® tube. Such a tube is transparent and its inner surface can serve as a specular reflective surface. To improve the quality of images obtained by such a tube, the outer surface can be painted with an opaque paint (preferably black) to block stray light which would otherwise be transmitted through the walls of the tube and to absorb second-surface reflections from inside. While such a tube is easy to obtain and relatively inexpensive, because its optical performance will not be as good as a high quality optical tube, image degradation will be cumulative for higher order images and higher order images will appear darker. To compensate for any exposure differences, camera electronics (or subsequent computer programs) can be used. For example, higher order images might be lightened; similarly, lower order images might be darkened.

To prevent image distortion in the first and higher order images near the center (bulging) which is noticeable only at close subject distances, a photograph should be taken of a subject using a tube which is not longer than approximately $1/100$ the distance of the subject, to minimize distortions.

To obtain sharp higher-order images, the camera's aperture should be stopped down to provide a large depth of field. Low order images, with, for example, only one reflection, will be acceptably sharp with the camera lens stopped down to approximately f8. Higher order images, with two or three reflections, will require that the lens be stopped down to f64 or more for acceptable sharpness. Thus, to maintain image quality, the f number is directly related to the image-order number.

It should be noted that the present invention can be adapted for many varied uses and situations. For example, a hole might be drilled through a wall and the reflective tube could be inserted into the hole and pushed through so that it is flush with the other side of the wall. In such a situation, reflective tubes of varied length might come in handy, depending upon the thickness of the wall. Absent the present invention, if one were to only peer through the hole in a wall of any thickness, the field of view would be greatly limited. As another example, the present invention might be used in connection with a moving vehicle in which the reflective tube might furtively protrude from underneath a tarp or other covering. In such a scenario, the reflective tube, if simply a Plexiglas® or other locally obtained tube painted black, could easily be discarded in case of emergency or when it is no longer needed.

While the invention has been described herein with reference to certain preferred embodiments, those embodiments have been presented by way of example only, and not to limit the scope of the invention. Additional embodiments thereof will be obvious to those skilled in the art having the benefit of this detailed description. For example, rather than painting the reflective tube black, a wrap of black electrical tape which makes optical contact (i.e., contact of a material of a similar refractive index so that the reflective property of the surface is negated) with the outer diameter might be used for ease of disassembly and destroying evidence of intended (or actual) use. Further modifications, such as use of video camera, are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A method for covert wide-angle photography, comprising the steps of:
   centering a reflective tube on a lens of a camera; and
   rotating at least one reflected annular image by 180° to register it with the open-hole (zero-order) image to obtain a wide-angle corrected image.

2. The method of claim 1, comprising the further step of:
   balancing exposures between the zero-order image and one or more reflected images.

3. The method of claim 1, wherein the image rotation is done by dedicated electronics of the camera.

4. The method of claim 1, wherein the image rotation is done by a computer.

5. The method of claim 1, wherein a first-order image is rotated 180° and aligned with a zero-order image.

6. The method of claim 5, wherein a third-order image is rotated 180° and aligned with the zero-order image.

7. The method of claim 6, wherein an f-stop of the camera is selected to maintain image quality for reflected images.

8. The method of claim 1, wherein a specular interior surface of the reflective tube is used as a reflective surface for the wide-angle adapter.

9. An apparatus for taking covert pictures, comprising:
   a camera with a wide-angle adapter comprised of a reflective tube positioned so that an aperture of the camera is centered in the tube's diameter; and
   electronics for rotating at least one odd-numbered image by 180° for registration with the zero-order image to obtain a wide-angle corrected image for viewing by the camera.

10. The apparatus of claim 9 in which the electronics are integral with the camera.

11. The apparatus of claim 10 in which the wide-angle corrected image is displayed by the camera in a viewing mode.

12. The apparatus of claim 10 in which the wide-angle corrected image is recorded by the camera in a storage medium.

13. The apparatus of claim 9 in which the electronics are external to the camera.

14. The apparatus of claim 9 wherein the reflective tube is made of a transparent material with a specular interior surface.

15. A method for covert wide-angle photography, comprising the steps of:
 centering a reflective tube on a lens of a camera; and
 rotating at least one reflected annular image by 180° to register it with the open-hole (zero-order) image to obtain a wide-angle corrected image;
 wherein the photograph is taken of an object using a tube which is no longer than approximately $1/100^{th}$ the distance of a photographic subject from the tube.

16. The method of claim 15, comprising the further step of: balancing exposures between the zero-order image and one or more reflected images.

17. The method of claim 15, wherein the image rotation is done by dedicated electronics of the camera.

18. The method of claim 15, wherein the image rotation is done by a computer.

19. The method of claim 15, wherein a first-order image is rotated 180° and aligned with a zero-order image.

20. The method of claim 19, wherein a third-order image is rotated 180° and aligned with the zero-order image.

21. The method of claim 20, wherein an f-stop of the camera is selected to maintain image quality for reflected images.

22. The method of claim 15, wherein a specular interior surface of the reflective tube is used as a reflective surface for the wide-angle adapter.

23. A method for covert wide-angle photography, comprising the steps of:
 centering a reflective tube on a lens of a camera; and
 rotating at least one reflected annular image by 180° to register it with the open-hole (zero-order) image to obtain a wide-angle corrected image;
 wherein the reflective tube is comprised of a transparent material and an outer surface of the transparent material is painted with an opaque paint to block stray light which would otherwise be transmitted through the walls of the tube and to absorb second-surface reflections from inside.

24. The method of claim 23, comprising the further step of: balancing exposures between the zero-order image and one or more reflected images.

25. The method of claim 23, wherein the image rotation is done by dedicated electronics of the camera.

26. The method of claim 23, wherein the image rotation is done by a computer.

27. The method of claim 23, wherein a first-order image is rotated 180° and aligned with a zero-order image.

28. The method of claim 27, wherein a third-order image is rotated 180° and aligned with the zero-order image.

29. A method for covert wide-angle photography, comprising the steps of:
 centering a reflective tube on a lens of a camera; and
 rotating at least one reflected annular image by 180° to register it with the open-hole (zero-order) image to obtain a wide-angle corrected image;
 wherein the reflective tube is comprised of a transparent material and an outer surface of the transparent material wrapped with a black tape which makes optical contact with the outer surface of the transparent material.

30. The method of claim 29, wherein the opaque paint is black.

31. An apparatus for taking covert pictures, comprising:
 a camera with a wide-angle adapter comprised of a reflective tube positioned so that an aperture of the camera is centered in the tube's diameter; and
 electronics for rotating at least one odd-numbered image by 180° for registration with the zero-order image to obtain a wide-angle corrected image for viewing by the camera;
 wherein the reflective tube is made of a transparent material with a specular interior surface and the outer surface of the transparent material is painted black to block stray light which would otherwise be transmitted through the walls of the tube.

32. The apparatus of claim 31 in which the electronics are integral with the camera.

33. The apparatus of claim 32 in which the wide-angle corrected image is displayed by the camera in a viewing mode.

34. The apparatus of claim 32 in which the wide-angle corrected image is recorded by the camera in a storage medium.

35. The apparatus of claim 31 in which the electronics are external to the camera.

* * * * *